United States Patent
Mazzanti et al.

(10) Patent No.: US 8,083,837 B2
(45) Date of Patent: Dec. 27, 2011

(54) BIOLOGICAL PROCESS FOR PURIFYING AIR IN CONFINED ROOMS AND APPARATUS THEREOF

(75) Inventors: Uranio Mazzanti, Tuscania (IT); Paolo De Filippis, Rome (IT); Marco Scarsella, Rome (IT)

(73) Assignee: Ingegneria Ambientale SRL, Rome (IT)

( * ) Notice: Subject to any disclaimer, the term of this patent is extended or adjusted under 35 U.S.C. 154(b) by 725 days.

(21) Appl. No.: 12/092,824

(22) PCT Filed: Nov. 3, 2006

(86) PCT No.: PCT/IT2006/000767
§ 371 (c)(1),
(2), (4) Date: Sep. 24, 2008

(87) PCT Pub. No.: WO2007/052323
PCT Pub. Date: May 10, 2007

(65) Prior Publication Data
US 2009/0064858 A1  Mar. 12, 2009

(30) Foreign Application Priority Data
Nov. 7, 2005  (IT) .............................. RM2005A0552

(51) Int. Cl.
  *B01D 53/34*  (2006.01)
(52) U.S. Cl. ................ 95/149; 95/226; 96/234; 96/278; 96/329; 435/266; 435/289.1; 210/602
(58) Field of Classification Search .................... 95/149, 95/226, 210; 96/224, 226, 234, 281, 283–289, 96/329, 278; 435/266, 299.1, 289.1; 422/120, 422/122; 210/602
See application file for complete search history.

(56) References Cited

U.S. PATENT DOCUMENTS

| | | | | |
|---|---|---|---|---|
| 3,072,978 A | * | 1/1963 | Minto | 96/224 |
| 3,644,914 A | * | 2/1972 | Veasaw et al. | 340/515 |
| 4,662,900 A | * | 5/1987 | Ottengraf | 435/266 |
| 4,781,732 A | * | 11/1988 | Wondrasch et al. | 95/71 |
| 4,999,302 A | * | 3/1991 | Kahler et al. | 435/266 |
| 5,045,215 A | * | 9/1991 | Lamarre | 210/747 |
| 5,089,036 A | * | 2/1992 | Hawes | 96/108 |
| 5,137,828 A | * | 8/1992 | Robinson et al. | 435/292.1 |
| 5,232,676 A | * | 8/1993 | Wolff et al. | 423/210 |
| 5,541,056 A | * | 7/1996 | Huntley et al. | 435/3 |
| 5,601,786 A | * | 2/1997 | Monagan | 422/108 |
| 5,985,649 A | * | 11/1999 | Stensel et al. | 435/266 |
| 6,013,512 A | * | 1/2000 | Turschmid et al. | 435/266 |
| 6,294,373 B1 | * | 9/2001 | van Lith | 435/266 |
| 6,402,816 B1 | * | 6/2002 | Trivett et al. | 95/226 |
| 6,610,528 B1 | * | 8/2003 | Mathur et al. | 435/243 |
| 6,843,835 B2 | * | 1/2005 | Fornai et al. | 96/53 |
| 6,884,347 B1 | * | 4/2005 | Krieger | 210/221.2 |
| 6,942,799 B2 | * | 9/2005 | Corcho-Sanchez et al. | 210/610 |
| 7,189,281 B2 | * | 3/2007 | Kim | 95/187 |
| 7,270,947 B2 | * | 9/2007 | Anderson et al. | 435/3 |
| 2010/0176053 A1 | * | 7/2010 | Adams et al. | 210/614 |

FOREIGN PATENT DOCUMENTS

DE  198 27 673 A1  2/1999

(Continued)

*Primary Examiner* — Duane Smith
*Assistant Examiner* — Ives Wu
(74) *Attorney, Agent, or Firm* — Young & Thompson

(57) ABSTRACT

A deputation process and corresponding apparatus for purification of the air of a closed environment characterized by indoor pollution, in which, in order to reduce the pollution, a water tank is provided that contains a multiplicity of active biomasses designed to absorb and metabolize the pollutant substances that are contained in the water and come from the air of the closed environment, and elements of water-air contact, designed precisely to transfer the pollutant substances from the closed environment into the water within the tank.

20 Claims, 2 Drawing Sheets

FOREIGN PATENT DOCUMENTS

Figure 1:
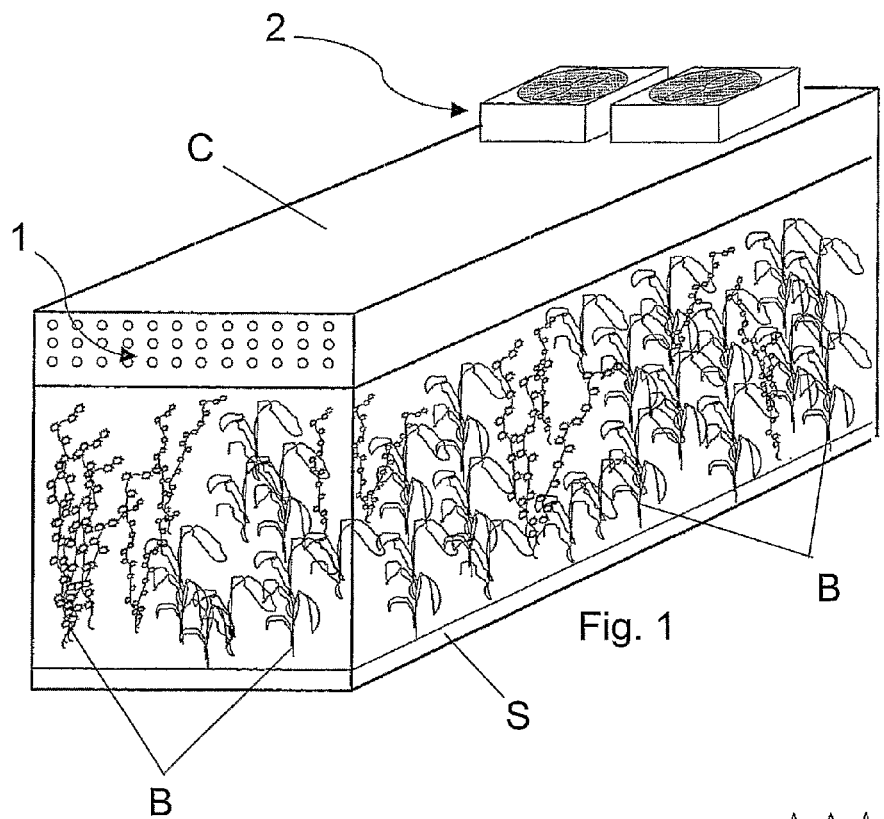

| | | | |
|---|---|---|---|
| EP | 1 416 229 A2 | 5/2004 | |
| EP | 1 500 883 A2 | 1/2005 | |
| JP | 05-261239 | * | 10/1993 |
| JP | 05261239 | * | 10/1993 |
| JP | 2002-709 A | 1/2002 | |
| NL | 1 001 236 C1 | 10/1995 | |
| WO | WO 9613970 | * | 5/1996 |
| WO | 03/059037 A2 | 7/2003 | |

* cited by examiner

BIOLOGICAL PROCESS FOR PURIFYING AIR IN CONFINED ROOMS AND APPARATUS THEREOF

BACKGROUND OF THE INVENTION

1. Field of the Invention

The present invention relates to the purification of air in a closed environment from the pollution to which said environment is exposed ("indoor pollution") by filtration, and in particular refers to an apparatus that depurates said air biologically from the substances that pollute it.

More specifically, said apparatus comprises a water tank that is equipped with a biological community that has the task of absorbing and metabolizing said pollutant substances and means of water-air contact that guarantee the transfer of said pollutant substances present in the air into the tank itself.

In other words, the effectiveness of the apparatus is based upon the transfer of the pollutant substances from the air present in the domestic or working environment to the water contained in the tank and on the natural filtering capacity of the biological community present in the tank itself. Said biological community constitutes in effect a true biological filter.

2. Description of the Related Art

The substances that pollute a closed environment are emitted by sources both external thereto (i.e., structural sources or sources that regard the occupants) and internal thereto (insulating materials, materials of construction, coatings, glues, adhesives, paints, etc.).

The high number of sources of emission present in restricted spaces and the consequent presence of pollutant substances of various nature renders indoor pollution a form of pollution that is extremely complex and difficult to control. Alongside chemical factors, different biological factors concur to pollute the air in dwellings and similar premises. Amongst these factors, a particular role is played by acari, which can be found in the dust present in dwellings and in the derivatives of domestic animals. To these may be added bacterial agents capable of proliferating in air-conditioning systems, creating dangerous bioaerosols. In this way, the noxious action of the combination of chemical and biological factors can create adverse synergistic effects on the health of a person.

Nowadays, there is an increasingly widespread sensitivity to the problems that this type of pollution entails, above all in relation to working and/or domestic environments.

Currently, since the control of the sources of indoor pollution is problematical, both on account of their variety and on account of the difficulty of acting on consolidated situations, different solutions are envisaged.

A first known solution consists in intervening by means of ventilation, through the introduction of external air (in the case of limited and distributed sources). A second known solution envisages localized forms of extraction (in the case of extremely large and delimited sources). However, even though said solutions are capable of limiting the concentrations of pollutants below the safety thresholds, a disadvantage is represented precisely by the difficulty of their application in domestic or working environments.

Consequently, in said situations, the only possibility of intervention on the concentration of pollutants is constituted by filtration, both of the air introduced from outside and of the recirculation air. But also this solution presents the disadvantage of being difficult to provide, above all in pre-existing buildings and taking into account the objective technical and economic limitations. In addition, there is the need to take into account aspects regarding maintenance of filtering systems, which, in addition to representing a further economic burden, can be noxious for the persons occupying an environment, on account of the release of pollutant substances from saturated filters.

SUMMARY OF THE INVENTION

Consequently, the main purpose of the present invention to overcome the above disadvantages by providing a method and an apparatus for biological treatment of the air of closed environments, such as, for example, domestic and/or working environments, in order to reduce considerably indoor pollution or eliminate it altogether.

The above is obtained through a water tank that is equipped with active biological elements or active biomasses, which are designed to absorb and metabolize the main substances responsible for indoor pollution, and means of water-air contact, which ensure an efficient transfer of said substances from the air to the water.

In order to carry said active biomasses provided within the tank is a series of purposely designed substrates.

Said contact means in turn comprise a cover for the aforesaid tank, said cover being equipped with means that determine inlet into the tank of the polluted air coming from the closed environment, means that enable the filtered air to be released into the environment itself, and means for illumination of the tank.

In order to increase the efficiency of the solution according to the invention, which is proportional to the surface of contact between the water and the air, means are provided for increasing the turbulence of the air in the tank and contributing to the movement of the water.

In order to increase further the capacity of depuration of the solution according to the invention and ensure biological purity of the outgoing air, insertion may be envisaged of at least one ozonizer for supplying ozone both to the flow of incoming air (air to be purified) and to the flow of outgoing air (air filtered by contact with the water).

Advantageously, said ozonizer performs the dual function of destroying the bacterial charge possibly present in the air reintroduced into the environment and, either alone or in presence of an oxidation catalyst, of ensuring a higher transfer in aqueous phase of the organic pollutants through partial oxidation thereof. In fact, the ozone introduced into the flow of incoming air "breaks down" the complex molecules of the pollutants present in the air itself.

It is possible to use just one ozonizer that generates two flows of ozone, one for the incoming air and one for outgoing air, or else two distinct ozonizers, one for inlet of the air to be filtered and one for outlet of the air filtered by the water.

In addition, it is preferable to deozonize the outgoing air—already filtered and ozonized for eliminating the bacterial charge possibly present—with an ozone-abater device of a known type. A non-limiting example of ozone abater could be a carbon filter.

The active biomasses can be represented, for example, by aquatic plants, preferably with fast development, by algae, and by the bacterial colonies that are contained in the substrate and/or that spontaneously install themselves in biological and wet-filtering systems.

BRIEF DESCRIPTION OF THE DRAWING FIGURES

A better understanding of the invention will be obtained from the ensuing detailed description and with reference to the attached plate of drawings, which illustrate, purely by way of example, a preferred embodiment.

Figure 2:
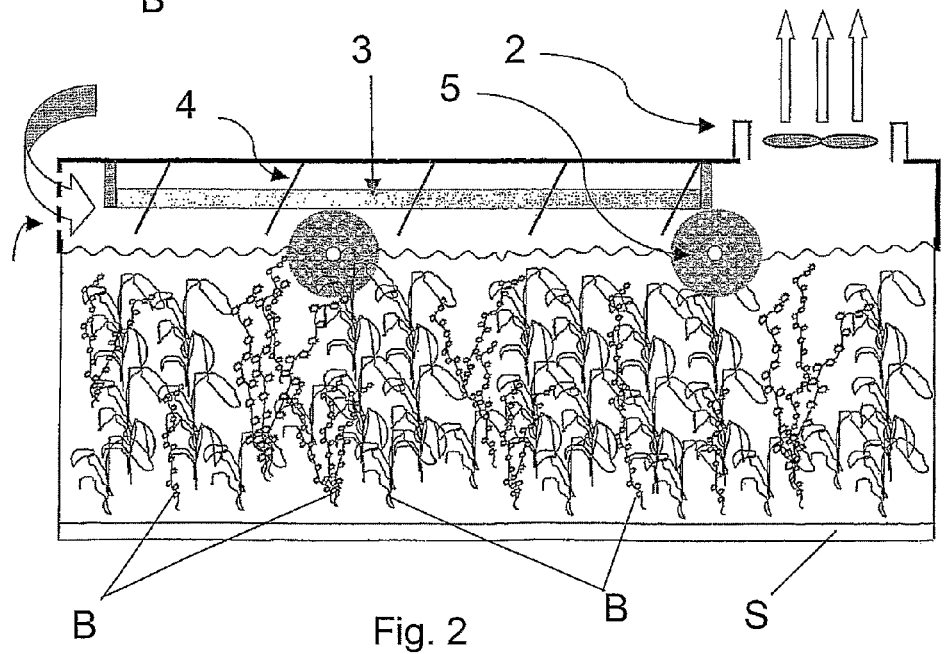
Figure 3:
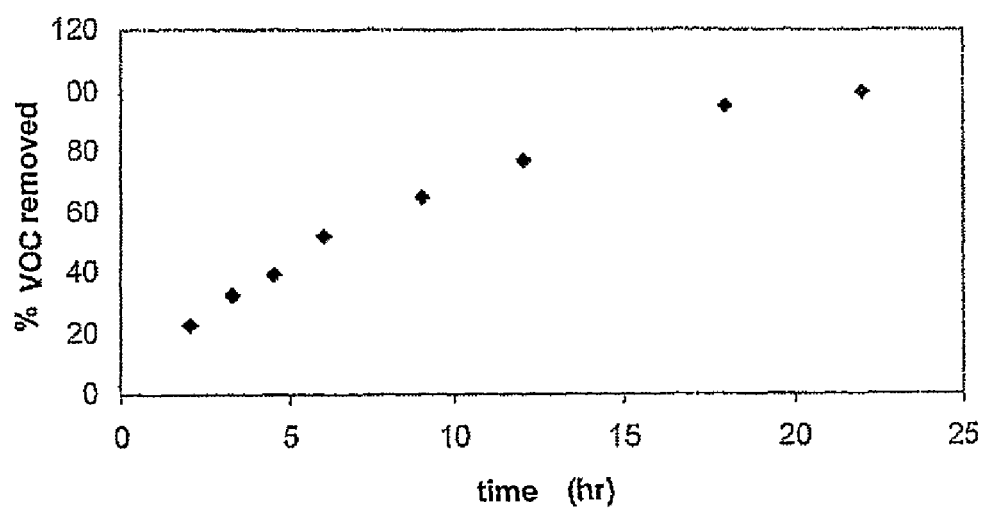

In the plate of drawings:

FIG. 1 is a perspective view of the invention;
FIG. 2 is a cross section of the invention;
FIG. 3 shows a diagram regarding the filtering capacity of the invention in certain conditions.

DETAILED DESCRIPTION OF THE INVENTION

With reference to the figures, in the embodiment described, the invention envisages a water tank V, which contains a multiplicity of active biomasses B, designed to absorb and metabolize the pollutant substances contained in the water and coming from the air of a closed environment, and means of water-air contact, designed to transfer said substances from the air of the closed environment to the water of the tank V itself.

Provided on the bottom of the tank V is a purposely designed substrate S for supporting said active biomasses B.

The means of water-air contact comprise a cover C for the tank V, which is equipped with means that determine passage of air from the closed environment to the tank or vice versa, with means that suck in the air from the tank to release it into said environment or vice versa, and with lighting means.

In the example illustrated in FIG. 2, the means that enable the air of the closed environment to enter the tank V are constituted by a grid 1, whilst the aspiration means, constituted, for example, by at least one ducted fan 2, release the air purified by the biomasses of the tank V into the closed environment. The lighting means are constituted by a lamp 3, preferably suitable for favouring growth and development of the biomasses B.

It is obvious that, as an alternative to the aspiration means described, it is possible to envisage at least one ducted fan installed in a position corresponding to the grid 1, designed to send the air forcedly between the cover and the free surface of the water.

Since the efficiency of the solution according to the invention increases as the surface of contact between the water and the air increases, means are provided for increasing the turbulence of the air in the tank V and hence move the water. Said means are constituted by one or more deflectors 4.

In order to increase further the surface of contact, it is possible to provide inside it one or more rotating disks 5 that are partially immersed in the water. Said disks 5 turn at a low rate, giving rise both to an effective wet-filtering of the air that impinges thereon and to the transfer of the pollutant substances that have adhered thereto to the water.

It is preferable for said disks 5 to be made of a porous polymeric material so as to constitute also a substrate suitable for installation of further active biomass.

It should be pointed out that, according to the requirements and the environmental conditions, it is possible to provide, in the tank V, a thermostatic regulator of the temperature of the water.

Alternatively, the means of water-air contact can also be provided by means of a contact column equipped with an aerator or ejector with Venturi effect, or else by means of a system for forced movement of the air in a direction tangential to the water surface by means of fans positioned on the cover C of the tank V.

The tank V is preferably made of glass or crystal glass, or of a non-toxic transparent plastic material.

It is evident that the dimensions of the tank V depend upon the amount of air that it is desired to purify and hence upon the volume of the premises in which it is located.

Likewise evident is the fact that the effectiveness of depuration depends upon the quality and quantity of active biomasses B present in the tank V.

It is sufficient to guarantee to the active biomasses B the appropriate hours of daylight and a regular intake of nutrients.

The substrate S is preferably mineral and of a non-calcareous nature and has a grain size comprised between 0.02 cm and 1 cm. In any case, it may be noted that the substrate can also be made of organic and/or inorganic material, and possibly appropriately activated.

In order to obtain a further purification of the air prior to its re-introduction into the environment, a germicidal lamp may be provided, set in the proximity of the fan 2 already described.

According to the invention, the process for purifying the air of a confined environment from pollutant substances responsible for indoor pollution basically comprises the following steps:

1—forced sending of the air to be purified to the system of wet-filtering and of air-water contact contained in a purposely provided deputation tank V;

2—re-introduction of the depurated air into the environment; and

3—deputation of the water from the pollutant substances transferred thereto from the air; said deputation of the water occurs by means of absorption and metabolization of the pollutant substances present in the tank V by purposely provided active biomasses B.

Advantageously, the apparatus purifies the air of confined environments to an appreciable extent, at the same time ensuring an optimal humidification of the environment itself.

A second advantage is represented by the fact that the apparatus requires a low power consumption.

A third advantage is represented by the fact that installation of said apparatus in the environment requiring deputation does not envisage any structural modifications either to the environment or to the building in which the environment itself is located.

A fourth advantage is represented by the fact that the apparatus does not require much maintenance, and does not entail a high cost.

A further advantage is represented by the aesthetic appearance of the solution according to the invention, which can resemble that of an aquarium.

As may be seen from FIG. 3, it has been experimented that in a confined environment purposely designed and having a concentration of volatile organic compounds (VOCs) equal to 0.010 mg/l, a tank V containing a volume of water of 110 l and equipped with active biomasses B represented by a dense and fast-growing aquatic vegetation and with means of air-water contact with forced tangential circulation, in which the substrate S for supporting said biomasses B is of an inorganic type with a quartz base and has a thickness of approximately 6 cm, drastically removed the VOCs of the air present in the aforesaid environment in approximately 24 hours.

The present invention has been described and illustrated according to a preferred embodiment thereof, but it may be readily understood that modifications and/or equivalent substitutions may be made by any person skilled in the branch, without thereby departing form the sphere of protection of the present industrial patent right.

The invention claimed is:

1. A depuration apparatus for the purification of air of a closed environment configured to reduce or eliminate the pollutant substances contained in the air of the closed environment, comprising:
   a tank (V) containing water;
   a plurality of active biomasses (B) immersed in the tank (V), the plurality of active biomasses (B) being designed to absorb and metabolize the pollutant substances that are contained in the water, the plurality of active biomasses (B) being supported by a purposely provided substrate (S);
   means for water-air contact, designed to transfer said pollutant substances from the air of the closed environment to the water of the tank (V) itself, the means for water-air contact comprising a cover (C) for the tank (V), said cover being equipped with means for determining contact of the polluted air with the water of the tank (V), with means for enabling the air filtered by forced contact with a surface of the water to be released into the environment itself, and with means for illumination of the tank;
   means for forcedly conveying the air of the environment to a system for wet-filtering and contact of the air with the water itself; and
   biological means for purifying the water from the pollutant substances transferred thereto and coming from the air of the closed environment, wherein
   in order to increase the surface of contact between the water and the air there are provided means for increasing turbulence of the air in the tank (V) and hence moving the water.

2. The apparatus according to claim 1, wherein said means for increasing the turbulence of the air of the tank (V) are one or more deflectors (4).

3. A depuration apparatus for the purification of air of a closed environment configured to reduce or eliminate the pollutant substances contained in the air of the closed environment, comprising:
   a tank (V) containing water;
   a plurality of active biomasses (B) immersed in the tank (V), the active plurality of biomasses (B) being designed to absorb and metabolize the pollutant substances that are contained in the water, the plurality of active biomasses (B) being supported by a purposely provided substrate (S);
   means for water-air contact, designed to transfer said pollutant substances from the air of the closed environment to the water of the tank (V) itself, the means for water-air contact comprising a cover (C) for the tank (V), said cover being equipped with means for determining contact of the polluted air with the water of the tank (V), with means for enabling the air filtered by forced contact with a surface of the water to be released into the environment itself, and with means for illumination of the tank;
   means for forcedly conveying the air of the environment to a system for wet-filtering and contact of the air with the water itself; and
   biological means for purifying the water from the pollutant substances transferred thereto and coming from the air of the closed environment, wherein
   in order to increase further the surface of contact between the water and the air there are provided one or more rotating rollers or disks (5), which are partially immersed in the water; said rotating rollers (5) being, designed to present a wet surface to the air that impinges on them and to transfer to the water the substances that have adhered thereto.

4. The apparatus according to claim 1, wherein the means for water-air contact are a contact column equipped with aerator or centrifugal pump with Venturi effect, or a system for forced movement of the air tangentially to the surface of the water by fans positioned on the cover (C) of the tank (V).

5. The apparatus according to claim 1, wherein, to increase further the transfer of the organic pollutants from the air to the water in the tank, there is provided an oxidizing device that uses ozone, designed to emit ozone into the air coming into the apparatus.

6. The apparatus according to claim 5, wherein an oxidizing capacity of the oxidizing device is further increased by envisaging the presence of a suitable catalyst of oxidation, designed to break down complex molecules of the pollutants present in the air.

7. The apparatus according to claim 1, wherein to ensure biological purity of the air leaving the apparatus there is provided an ozonizer or a UV germicidal system.

8. The apparatus according to claim 7, wherein the apparatus further comprises an ozone abater for eliminating or reducing an amount of ozone present in the flow of air leaving the apparatus.

9. The apparatus according to claim 1, wherein said lighting means are favourable to growth and development of the biomasses (B).

10. The depuration apparatus according to claim 1, wherein said means for illumination are constituted by a lamp (3).

11. The depuration apparatus according to claim 1, wherein said substrate (S) is a mineral of a non-calcareous nature and has a grain size comprised between 0.02 cm and 1 cm.

12. The depuration apparatus according to claim 1, wherein said substrate (S) is made of at least one of organic or inorganic material.

13. The depuration apparatus according to claim 12, characterized wherein said substrate (S) is activated.

14. The depuration apparatus according to claim 11, wherein the apparatus further comprises a thermostatic regulator of the temperature of the water.

15. The depuration apparatus according to claim 1, wherein the apparatus further comprises a germicidal lamp, designed to carry out a further depuration of the air prior to its re-introduction into the closed environment.

16. The apparatus according to claim 3, wherein the means for water-air contact are provided by a contact column equipped with aerator or centrifugal pump with Venturi effect, or a system for forced movement of the air tangentially to the surface of the water by fans positioned on the cover (C) of the tank (V).

17. The apparatus according to claim 3, wherein, to increase further the transfer of the organic pollutants from the air to the water in the tank, there is provided an oxidizing device that uses ozone, designed to emit ozone into the air coming into the apparatus.

18. The apparatus according to claim 17, wherein an oxidizing capacity of the oxidizing device is further increased by envisaging the presence of a suitable catalyst of oxidation, designed to break down complex molecules of the pollutants present in the air.

19. The apparatus according to claim 3, wherein to ensure the biological purity of the air leaving the apparatus there is provided an ozonizer or a UV germicidal system.

20. The apparatus according to claim 19, wherein the apparatus further comprises an ozone abater for eliminating or reducing an amount of ozone present in the flow of air leaving the apparatus.

* * * * *